May 10, 1949. C. M. LEE 2,469,691
LENS MOUNT FOCUSING CAP
Filed Aug. 28, 1947
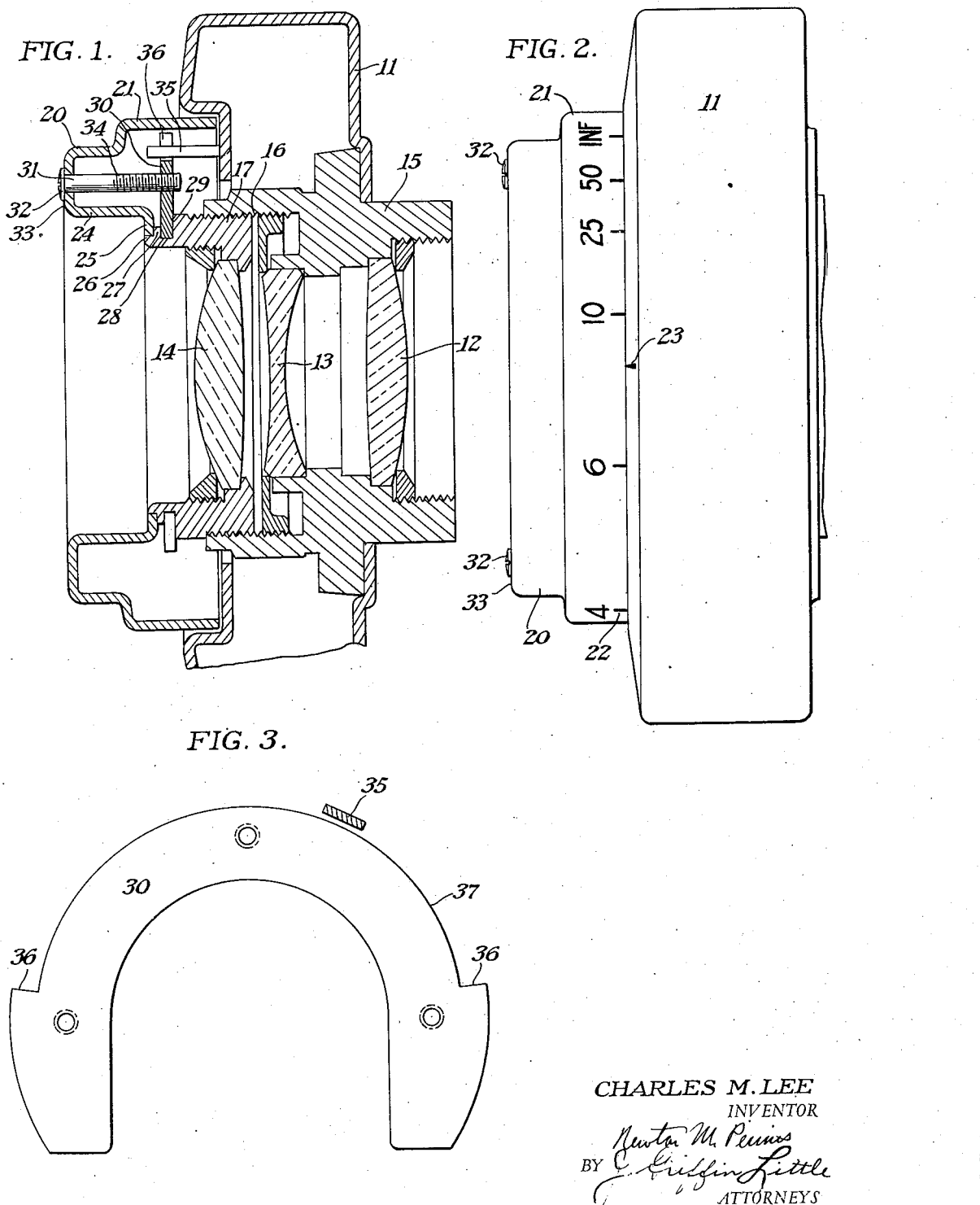
CHARLES M. LEE
INVENTOR Patented May 10, 1949

2,469,691

UNITED STATES PATENT OFFICE 2,469,691

LENS-MOUNT FOCUSING CAP

Charles M. Lee, Rochester, N. Y., assignor to Eastman Kodak Company, Rochester, N. Y., a corporation of New Jersey Application August 28, 1947, Serial No. 771,028

3 Claims. (Cl. 95—45)

The present invention relates to photography, and more particularly to focusing lens mounts in which one of the lens cells, in the present instance the front lens cell, is axially movable or adjustable to focus the entire lens system in the mount.

The principal object of the invention is the provision of a new and simple form of focusing cap.

Another object of the invention is the provision of a simplified mechanism for connecting the cap to the adjustable lens cell.

Yet another object of the invention is the provision of an arrangement by which a part of the connecting mechanism cooperates with the lens mount to limit the focusing adjustment of the movable or adjustable lens cell.

To these and other ends, the invention resides in certain improvements and combinations of parts, all as will be hereinafter more fully described, the novel features being pointed out in the claims at the end of the specification.

In the drawings:

Fig. 1 is a longitudinal sectional view through a lens mount, showing a focusing cap, and a connecting means constructed in accordance with the present invention;

Fig. 2 is an outer view of the mount illustrated in Fig. 1; and

Fig. 3 is a front view of the pinch ring of the present invention.

Similar reference numerals throughout the various views indicate the same parts.

The drawings show a lens mount or shutter housing 11 in which are positioned the aligned lens elements 12, 13 and 14. The lenses 12 and 13 are mounted in a single cell 15 which is secured in fixed position to the shutter housing or mount in any suitable well-known manner. The front end of the cell 15 is provided with an internal thread 16 adapted to engage a corresponding thread formed on a focusing or adjustable cell 17 in which the front lens 14 is positioned. Thus, the front cell 17 may be axially adjusted to position the front lens 14 to focus the entire lens system, as will be readily apparent to those in the art. As the cell 17 is carried by the cell 15 which, in turn, is fixed to the housing 11, the cell 17 may be broadly considered as movable or adjustable on the housing for focusing.

An annular focusing cap 20, which is U-shaped in transverse section, as shown in Fig. 1, is formed with an outer leg section 21 on which a focusing scale 22 is formed to cooperate with a fixed index mark 23 on the housing 11, as shown in Fig. 2. The other or inner leg 24 of the cap 20 terminates in an inturned flange or rim 25 which rests on the outer surface of a reduced forward end 26 of the cell 17. The latter thus supports the cap 20. In the initial focusing, the cap 20 is not connected to the cell 17, and the latter is focused on an object spaced at a definite distance. When the image is properly focused, the cap 20 is rotated relative to the cell 17 to bring the proper reading on the scale 22 into registry with the index mark 23. Thereupon, the cap 20 is connected to the cell 17, in a manner to be presently described, so that in future focusing operations, the cap 20 and adjustable cell 17 will rotate as a unit.

To secure this connection, the end 26 of the adjustable cell is provided with a radially projecting annular flange or rim 27 positioned in contact with the rim 25, as shown in Fig. 1. A peripheral slot 28 is formed between the flange 27 and a shoulder 29 on the adjustable cell 17, and is adapted to receive a flat, semi-annular or horseshoe-shaped pinch ring 30. Thus, the flange 27 is positioned between the rim 25 of cap 20 and the pinch ring 30, as clearly shown in Fig. 1. After the cell 17 has been properly positioned to focus the mount initially, and the cap 20 has been adjusted to bring the proper portion of the scale 22 into registry with the index mark 23, the cap 20 and ring 30 are connected together and to the cell 17. To this end, a pair of threaded members 31 have their heads 32 in engagement with the outer surface 33 of the cap 20 while the threaded ends 34 engage in threaded openings in the ring 30. When the screws are turned in, the cap 20 and ring 30 will be drawn together to pinch the flange 27 therebetween to provide a frictional connection between the cap and the cell 17. The cap is thus rigidly secured to the adjustable cell and will then turn as a unit therewith during subsequent focusing operations.

As is common practice, means are provided to limit the rotation or adjusting movement of the cell 17 and cap 20. To secure this result, the housing 11 is formed with an upstruck lug or finger 35 which is positioned within the cap 20 and extends forwardly to overlie the ring 30. The latter is provided with spaced shoulders or abutments 36 on the outer surface 37 thereof. These shoulders are in the path of the finger 35, as shown in Fig. 3, so that when the cell 17 and cap 20 have reached their limit of rotation, one of the shoulders 36 will engage the finger 35 to limit or arrest further rotation of the cap itself.

Thus, the present invention provides a simple and effective means for securing the focusing cap to the adjustable lens cell so as to rotate as a unit therewith during focusing. The cap cooperates with the pinch ring to provide the desired frictional connection. Also the ring, as well as the limiting finger 35, are all positioned or housed within the hollow cap, as clearly illustrated in Fig. 1.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a focusing lens mount having axially aligned lens-carrying cells one of which is axially adjustable for focusing the mount, of a hollow cup-shaped focusing cap formed with a focusing scale and supported by said adjustable cell, a semi-annular pinch ring carried by said adjustable cell and positioned within said cap, an annular flange formed on said adjustable cell and positioned between said cap and said ring, means for connecting and drawing said cap and ring into tight frictional engagement with said flange to connect the latter to said cap for movement as a unit therewith during focusing, a lug formed from said mount, and a shoulder formed on the periphery of said ring and adapted to engage said lug to limit the movement of said adjustable cell.

2. In a focusing lens mount having axially aligned lens-carrying cells one of which is axially adjustable for focusing the mount, of a channel-shaped focusing cap formed with a focusing scale and supported by said adjustable cell, a flat semi-annular pinch ring carried by said adjustable cell and positioned within and enclosed by said cap, an annular flange formed on said adjustable cell and extending into said cap and positioned between said cap and ring, screws extending through the web of said cap and engaging said ring to draw said cap and ring into tight frictional engagement with said flange to connect said ring and cap to said adjustable cell to move as a unit therewith during focusing, a lug formed from said mount and extending into said cap and overlying said ring, and shoulder means carried by the periphery of said ring and adapted to engage said lug to limit the focusing movement of said adjustable cell.

3. In a focusing lens mount having axially aligned lens-carrying cells one of which is axially adjustable for focusing the mount, of a focusing cap which is U-shaped in transverse section to provide a pair of spaced members one of which is provided with a focusing scale, while the end of the other member rests on and is supported by said adjustable cell, a flat semi-annular pinch ring supported on said adjustable cell adjacent said end and extending radially across said cap toward said one member, an annular flange formed on said cell and positioned between and spacing said end and said ring, screws extending through said cap and engaging said ring to draw the latter and said end into clamping relation with said flange to connect said cap to said adjustable cell, a lug formed from said mount and overlying said ring, and spaced shoulders on the periphery of said ring adapted to engage said lug to limit the focusing movement of said adjustable cell.

CHARLES M. LEE.

REFERENCES CITED

The following references are of record in the file of this patent:

UNITED STATES PATENTS

| Number | Name | Date |
| --- | --- | --- |
| 1,262,347 | Ide | Apr. 9, 1918 |
| 1,620,727 | Howell | Mar. 15, 1927 |
| 2,143,813 | Wood | Jan. 10, 1939 |
| 2,245,241 | Wood | June 10, 1941 |
| 2,432,479 | Lee | Dec. 9, 1947 |